(12) United States Patent
Kitamura et al.

(10) Patent No.: US 8,600,170 B2
(45) Date of Patent: Dec. 3, 2013

(54) EDGE EXTRACTION APPARATUS, SURVEYING EQUIPMENT, AND PROGRAM

(75) Inventors: Kazuo Kitamura, Tokyo (JP); Nobuo Kochi, Tokyo (JP); Hitoshi Otani, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 451 days.

(21) Appl. No.: 12/954,395

(22) Filed: Nov. 24, 2010

(65) Prior Publication Data

US 2011/0085738 A1 Apr. 14, 2011

Related U.S. Application Data

(63) Continuation of application No. PCT/JP2009/059935, filed on May 26, 2009.

(30) Foreign Application Priority Data

May 26, 2008 (JP) ................................. 2008-137136

(51) Int. Cl.
*G06K 9/48* (2006.01)
(52) U.S. Cl.
USPC ........................................................ 382/199
(58) Field of Classification Search
None
See application file for complete search history.

(56) References Cited

U.S. PATENT DOCUMENTS 6,654,497 B1 11/2003 Kondo et al.

FOREIGN PATENT DOCUMENTS

| JP | 08-329252 A | 12/1996 |
|----|----|----|
| JP | 10-267618 A | 10/1998 |
| JP | 2000-155841 A | 6/2000 |
| JP | 2000-209430 A | 7/2000 |
| JP | 2001-177728 A | 6/2001 |

OTHER PUBLICATIONS

International Search Report for International Application No. PCT/JP2009/059935, dated Jun. 30, 2009, 1 page.

*Primary Examiner* — Samir Ahmed
(74) *Attorney, Agent, or Firm* — Brinks Gilson & Lione

(57) ABSTRACT

An edge extraction device can reduce detected noise other than a contour of an article, and can improve the operability. The edge extraction device includes: an edge detection section which calculates edge strength from an image and detects an edge; a labeling processing section which performs labeling processing on the edge detected by the edge detection section and calculates a length of the edge; an edge enhancement processing section which performs edge enhancement processing by using a value corresponding to the length of the edge, which is calculated by the labeling processing section, and the edge strength, which is calculated by the edge detection section; and an edge extraction section which performs binarization processing on a value of the image, which is enhanced by the edge enhancement processing section, by using an adjustable threshold value, and extracts a predetermined edge.

14 Claims, 20 Drawing Sheets

Fig. 6A
Fig. 6B
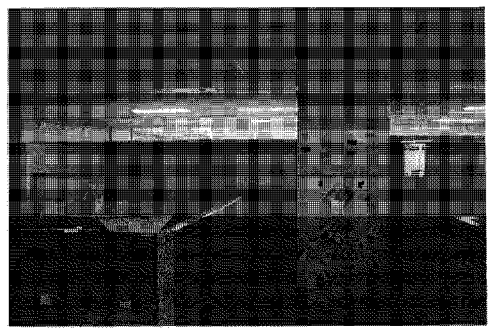
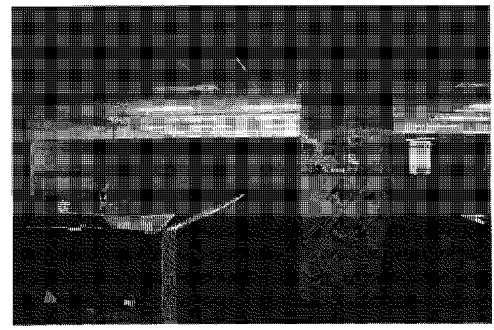
Fig. 6C
Fig. 6D
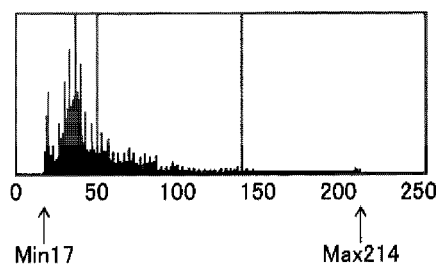
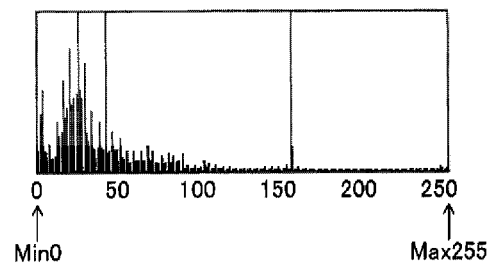

Fig. 8A
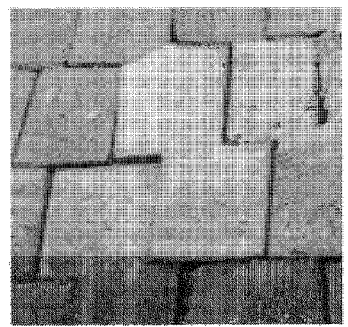
Fig. 8B
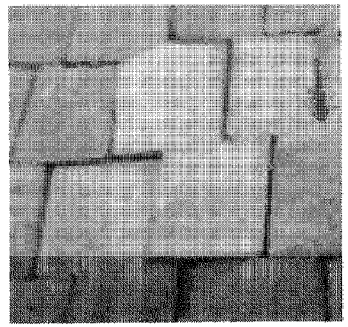
Fig. 9
| 1 | 2 | 1 |
|---|---|---|
| 2 | 4 | 2 |
| 1 | 2 | 1 |
Fig. 10
| $a_1$ | $b_1$ | $c_1$ |
|---|---|---|
| $a_2$ | $b_2$ | $c_2$ |
| $a_3$ | $b_3$ | $c_3$ |

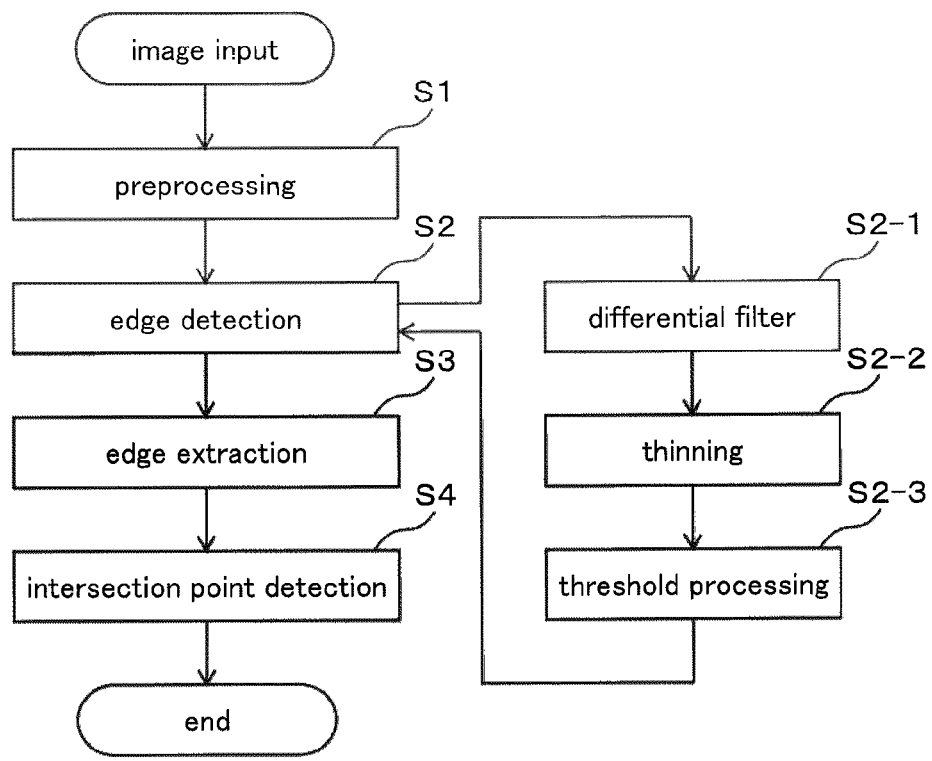

Fig. 13A
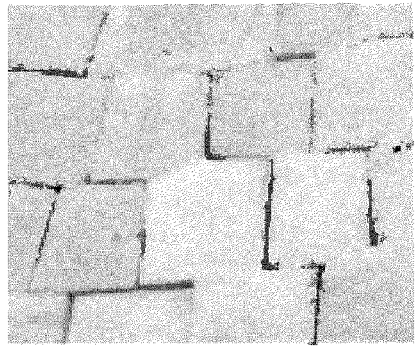
Fig. 13B
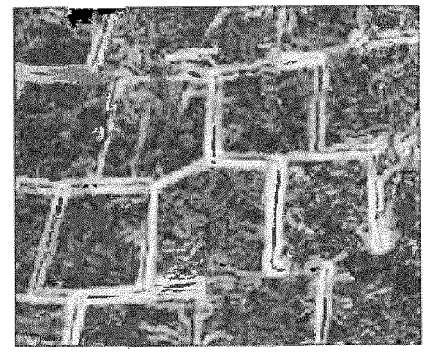
Fig. 14A
| 0 | 0 | 0 |
|---|---|---|
| * | 1 | * |
| 1 | 1 | 1 |
| 0 | 0 | * |
|---|---|---|
| 0 | 1 | 1 |
| * | 1 | 1 |
| 0 | * | 1 |
|---|---|---|
| 0 | 1 | 1 |
| 0 | * | 1 |
Fig. 14B
| 1 | 1 | 1 |
|---|---|---|
| * | 1 | * |
| 0 | 0 | 0 |
| 1 | 1 | * |
|---|---|---|
| 1 | 1 | 0 |
| * | 0 | 0 |
| 1 | * | 0 |
|---|---|---|
| 1 | 1 | 0 |
| 1 | * | 0 |
Fig. 14C
| 1 | * | 0 |
|---|---|---|
| 1 | 1 | 0 |
| 1 | * | 0 |
| * | 0 | 0 |
|---|---|---|
| 1 | 1 | 0 |
| 1 | 1 | * |
| 0 | 0 | 0 |
|---|---|---|
| * | 1 | * |
| 1 | 1 | 1 |
Fig. 14D
| 0 | * | 1 |
|---|---|---|
| 0 | 1 | 1 |
| 0 | * | 1 |
| * | 1 | 1 |
|---|---|---|
| 0 | 1 | 1 |
| 0 | 0 | * |
| 1 | 1 | 1 |
|---|---|---|
| * | 1 | * |
| 0 | 0 | 0 |

Fig. 18A

| $X_4$ | $X_3$ | $X_2$ |
|---|---|---|
| $X_5$ | $X_0$ | $X_1$ |
| $X_6$ | $X_7$ | $X_8$ |

Fig. 18B

| 1 | 1 |   |   |   |   |
|---|---|---|---|---|---|
|   |   | 2 |   |   |   |
|   | 3 | 2 |   |   |   |
|   | 3 | ① | 1 |   |   |
|   | 1 | 1 | 1 |   |   |
|   |   |   |   |   |   |

| i | LUT(i) |
|---|---|
| 1 | 1 |
| 2 | 2 |
| 3 | 3 |

Fig. 18C

| 1 | 1 |   |   |   |   |
|---|---|---|---|---|---|
|   |   | 2 |   |   |   |
|   | 3 | 2 |   |   |   |
|   | 3 | ② | 2 |   |   |
|   | 2 | 2 | 2 |   |   |
|   |   |   |   |   |   |

| i | LUT(i) |
|---|---|
| 1 | 1 |
| 2 | 2 |
| 3 | 2 |

EDGE EXTRACTION APPARATUS, SURVEYING EQUIPMENT, AND PROGRAM

RELATED APPLICATIONS

This application is a continuation of PCT/JP2009/059935 filed on May 26, 2009, which claims priority to Japanese Application No. 2008-137136 filed on May 26, 2008. The entire contents of these applications are incorporated herein by reference.

BACKGROUND OF THE INVENTION

1. Technical Field

The present invention relates to an edge extraction device for extracting a contour or the like of an article from an image. In particular, the present invention relates to an edge extraction device which extracts edges based on length and strength of edges.

2. Background Information

In conventional techniques, various methods for detecting edges in an image have been known. An edge is a portion at which brightness changes sharply in a gray image. In general, the sharp change occurs at a contour of an article, so that the contour of the article can be extracted from the result of edge detection.

The edge detection is performed such that change in brightness values of local pixels are checked and a portion, at which the change is great, is detected as an edge. A representative edge detection method is a method using a differential filter. For example, a Sobel filter, a Laplacian filter, a Prewitt filter, a Roberts filter, or the like is used as the differential filter.

However, these differential filters detect an edge based on only the brightness information, so that a pattern and color change inside an article may also be detected, and it is difficult to detect only the contour which is an outline shape of the article. For example, a method disclosed in Japanese Unexamined Patent Application Publication No. H8-329252 is a method for solving this problem. In the invention disclosed in Japanese Unexamined Patent Application Publication No. H8-329252, an edge direction is estimated, and edge strength is calculated from the estimated edge direction and gradients at respective positions. Thus, a directional characteristic of the edge can be obtained, so that only the edge which forms a contour can be detected.

An edge detection method is disclosed in which it is determined whether or not the detected one is a contour of an article based on length and curvature degree of edge (see, for example, Japanese Unexamined Patent Application Publication No. 2001-177728). In the invention disclosed in Japanese Unexamined Patent Application Publication No. 2001-177728, a short edge and a sharply curved edge are recognized as noise, so that only the contour can be detected.

However, in the above invention of Japanese Unexamined Patent Application Publication No. H8-329252, in order to estimate an edge direction, a cubic spline curve is generated from a group of points on a contour specified by an operator, and it is difficult to detect only the contour of article automatically. A process, in which a cubic spline curve or a spline curve having an order different from it is calculated, is time-consuming.

On the other hand, the above invention of Japanese Unexamined Patent Application Publication No. 2001-177728 does not disclose that a threshold process is performed such that edge strength detected by a differential filter is related to length of edge. Due to this, although the edge strength is great, the edge may not be detected since the length of the edge is short. When the threshold process is performed by using the length and the curvature degree of the edge as an independent parameter, it is difficult to extract a desired edge intuitively, and the operability is deteriorated.

SUMMARY OF THE INVENTION

An object of the present invention is to provide a technique that can reduce detected noise other than a contour of an article and can improve the operability in consideration of the above problems.

According to a first aspect (claim 1) of the present invention, an edge extraction device includes: an edge detection section which calculates edge strength from an image and detects an edge; a labeling processing section which performs labeling processing on the edge detected by the edge detection section and calculates a length of the edge; an edge enhancement processing section which performs edge enhancement processing by using a value corresponding to the length of the edge, which is calculated by the labeling processing section, and the edge strength, which is calculated by the edge detection; and an edge extraction section which performs binarization processing on a value of the image, which is enhanced by the edge enhancement processing section, by using an adjustable threshold value, and extracts a predetermined edge.

According to this aspect of the present invention, the image is binarized by the value corresponding to the length of the edge and the edge strength. Thus, the portion, which has the length of the edge which is relatively short and the edge strength which is relatively low, can be removed as noise. The portion, which has the high edge strength, cannot be removed even when the length of the edge is short. The portion, which has the long edge strength, cannot be removed even when the edge strength is low. By this feature, detection amount of noise other than the contour of the article can be reduced.

According to a desirable first embodiment (claim 2) of the present invention, the edge detection section may perform edge detection by using a differential filter typified by a Sobel filter. In this embodiment, by using the differential filter, many edges can be easily detected while the generation of the noise is inhibited.

According to a desirable second embodiment (claim 3) of the present invention, the threshold value of the edge extraction section may be adjustable by a single operational section. In this embodiment, since the contour of the article can be extracted by only the one parameter (the value corresponding to the length of the edge and the edge strength), the operability can be improved.

According to a desirable third embodiment (claim 4) of the present invention, the operational section may be structured so as to be adjustable by a single slider operational section. In this embodiment, the parameter (the value corresponding to the length of the edge and the edge strength) can be adjusted by the single slider operational section, so that the operability can be improved.

According to a desirable fourth embodiment (claim 5) of the present invention, the edge extraction device may further include a preprocessing section which performs preprocessing prior to processing by the edge detection section, and the preprocessing section may have a processing content structured so as to be changeable in accordance with characteristics of an article. In this embodiment, when the contour of the article is darker than surroundings, or when the brightness unevenness of the article is greater than that of the surroundings, the processing content can be changed in accordance with characteristics of the article, the detection accuracy of the contour of the article can be improved, and the detection of the noise can be inhibited.

According to a desirable fifth embodiment (claim 6) of the present invention, the edge extraction device may further include a preprocessing section which performs reduction processing prior to processing by the edge detection section. In this embodiment, the resolution can be reduced by the reduction processing, so that the detection of the noise can be inhibited, and the processing time after the reduction processing can be reduced.

According to a desirable sixth embodiment (claim 7) of the present invention, a signal to noise ratio may be defined as a ratio of number of pixels extracted by the edge extraction section to number of pixels not extracted by the edge extraction section, and the edge detection section may perform edge detection by automatically determining a threshold value of the edge strength based on the signal to noise ratio. In this embodiment, when the edge strength is relatively low, the edges can be easily detected while the generation of the noise is inhibited.

According to a desirable seventh embodiment (claim 8) of the present invention, the edge extraction device may further include an intersection point detection section which detects an intersection point of edges extracted by the edge extraction section. In this embodiment, the intersection point of the edges can be detected, so that the contour shape of the article can be estimated.

According to a desirable eighth embodiment (claim 9) of the present invention, the intersection point detection section may calculate regression lines from endpoints of the edges extracted by the edge extraction section, and may detect an intersection point of the regression lines. In this embodiment, the regression lines can be calculated from the endpoints of the edges, so that the intersection point of the regression lines can be rapidly detected.

According to a desirable ninth embodiment (claim 10) of the present invention, the edge extraction device may further include a corner removal section which removes a corner of the edge detected by the edge detection section. In this embodiment, since in the edge other than the contour of the article, corners are more than in the contour edge of the article, only the contour edge of the article can be easily extracted by extracting the edges based on the length of the edges divided by removing the corners. The extraction by the corner removal can be performed faster than the detection using the known Hough transform.

According to a desirable tenth embodiment (claim 11) of the present invention, the corner removed by the corner removal section may have an angle structured so as to be adjustable. In this embodiment, the angle of the corner removed by the corner removal section can be adjusted, so that the contour edge formed by a line component or a curve component can be extracted.

According to a second aspect (claim 12) of the present invention, the survey instrument includes: a structure of the edge extraction device of the seventh embodiment (claim 8), and is structured to perform measurement such that a line of sight is adjusted so as to be directed to the edge extracted by the edge extraction section, or the intersection point or an endpoint detected by the intersection point detection section. In this aspect of the present invention, the survey instrument measures only the edge, the intersection point, or the endpoint, the survey instrument can measure more rapidly than the case in which the measurement is performed by scanning entirety of the measurement area.

According to a third aspect (claim 13) of the present invention, a program includes steps of: edge detection for calculating edge strength from an image and detecting an edge; labeling processing for performing labeling processing on the edge detected in the edge detection and calculating length of the edge; edge enhancement processing for performing edge enhancement processing by using a value corresponding to the length of the edge, which is calculated in the labeling processing, and the edge strength, which is calculated in the edge detection; and edge extraction for performing binarization processing on a value of the image, which is enhanced by the edge enhancement processing, by using an adjustable threshold value, and extracting a predetermined edge. In this aspect of the present invention, detected noise other than the contour of the article can be reduced.

According to a fourth aspect (claim 14) of the present invention, a program executed by the survey instrument has a structure of the edge extraction device of the seventh embodiment (claim 8), and the program makes the survey instrument execute a measurement step in which a line of sight of the survey instrument is adjusted so as to be directed to the edge extracted by the edge extraction section, or the intersection point or an endpoint detected by the intersection point detection section. In this aspect of the present invention, the survey instrument measures only the edge, which is extracted by the survey instrument, the intersection point, or the endpoint, the survey instrument can measure more rapidly than the case in which the measurement is performed by scanning entirety of the measurement area.

According to the present invention, detected noise other than the contour of the article can be reduced, and the operability can be improved.

BRIEF DESCRIPTION OF THE DRAWINGS

FIG. 6A is a drawing substitute photograph showing an input image;

FIG. 6B is a drawing substitute of a photograph showing an image after histogram stretching;

FIG. 6C is a histogram of the input image;

FIG. 6D is a histogram after the histogram stretching;

FIG. 8A is a drawing substitute of a photograph showing an input image;

FIG. 8B is a drawing substitute of a photograph showing an image smoothed by a Gaussian filter;

FIG. 9 is a diagram showing an example of a Gaussian filter;

FIG. 10 is a diagram showing a 3×3 pixel matrix;

FIG. 11 is a diagram showing a flow chart of an edge detection section;

FIG. 12A is a differential filter of an X detection;

FIG. 12B is a differential filter of a Y detection;

FIG. 13A is a drawing substitute of a photograph showing an input image;

FIG. 13B is a drawing substitute of a photograph showing an edge strength image after using a differential filter;

FIG. 14A shows a pattern condition of a case in which a raster scan is performed from the upper left to the lower right;

FIG. 14B shows a pattern condition of a case in which a raster scan is performed from the lower right to the upper left;

FIG. 14C shows a pattern condition of a case in which a raster scan is performed from the upper right to the lower left;

FIG. 14D shows a pattern condition of a case in which a raster scan is performed from the lower left to the upper right;

FIG. 18A is a diagram showing eight neighboring pixels;

FIGS. 18B and 18C are diagrams showing an image subjected to labeling and a lookup table;

DETAILED DESCRIPTION OF THE PREFERRED EMBODIMENTS

1. First Embodiment

One example of an edge extraction device and a program will be explained hereinafter.

Figure 1:
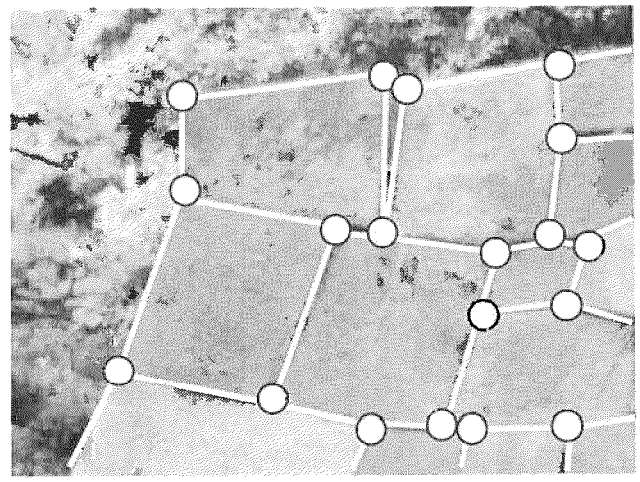
FIG. 1 is a drawing substitute of a photograph for explaining characteristics to be extracted.

Edge extraction processing is processing in which characteristics (contour lines, endpoints of the contour lines, and intersection points of the contour lines) are automatically extracted from an image. FIG. 1 is a drawing substitute of a photograph for explaining characteristics to be extracted. In FIG. 1, a stone wall, which is an article, is shown. Characteristics of the stone wall, which are to be extracted, are contour lines of respective stones shown by solid lines, intersection points (circles) or endpoints of the contour lines. Pattern portions of the stones, which are detail characteristics, are judged as noise.

Figure 2:
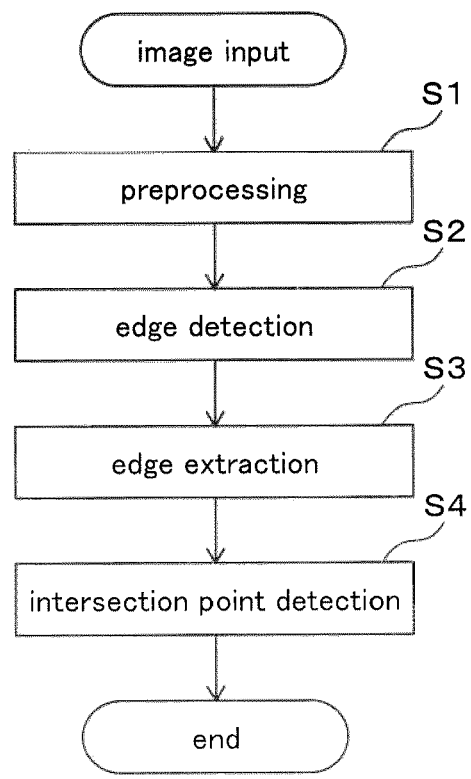
FIG. 2 is a schematic flow chart of an edge extraction program.

FIG. 2 is a schematic flow chart of an edge extraction program. This edge extraction program is stored in a storage media (CD-ROM) and can be provided. First, the edge extraction program executes preprocessing (in step S1). After the preprocessing, the edge extraction program executes edge detection (in step S2), extracts edges which are contours of the article (in step S3), and detects intersection points of the extracted edges (in step S4). Hereinafter, the processing at each step will be explained in detail.

1. Preprocessing Section

Figure 3:
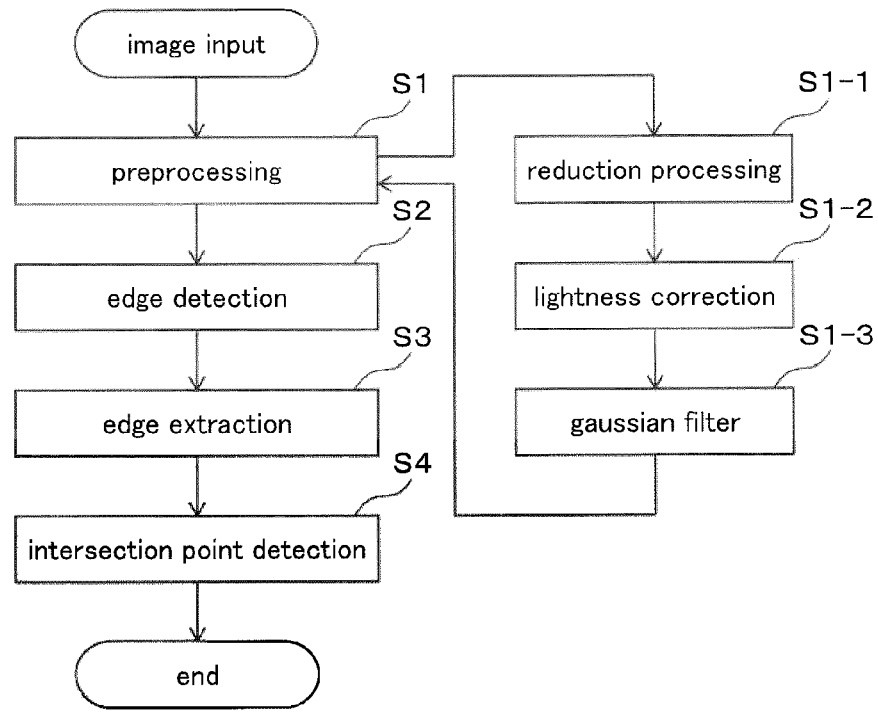
FIG. 3 is a flow chart of a preprocessing section.

The preprocessing section supposes various articles, photographing circumstances, and the like, and it adjusts an input image to have an image quality suitable for edge detection. FIG. 3 is a flow chart of a preprocessing section. The preprocessing section performs reduction processing (in step S1-1), corrects lightness (in step S1-2), and uses a Gaussian filter (in step S1-3).

1.1 Reduction Processing Section

Figure 4:
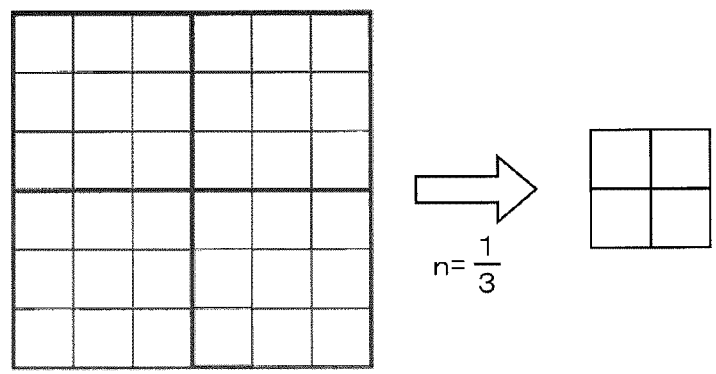
FIG. 4 is a diagram for explaining a reduction method.

FIG. 4 is a diagram for explaining a reduction method. When a reduction rate is $1/n$ (an area ratio is $1/n^2$), the reduction processing section calculates an average value of brightness at an n×n pixel matrix, and replaces the n×n pixel matrix by one pixel having the calculated average value of brightness. For example, as shown in FIG. 4, when the reduction rate is ⅓, the 3×3 pixel matrix is replaced by one pixel having the average value of brightness at the 3×3 pixel matrix.

Figure 5A:
FIGS. 5A to 5C are drawing substitutes of photographs showing comparison of edge detection of cases in which reduction processing is performed.
Figure 5B:
Figure 5C:
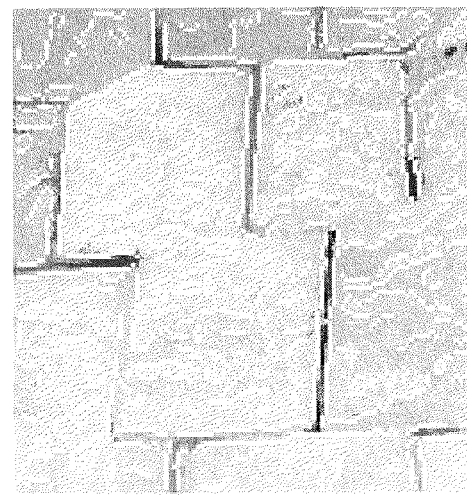

FIGS. 5A to 5C are drawing substitutes of photographs showing comparison of edge detection in cases in which reduction processing is performed. FIG. 5A shows the case in which the reduction processing is not performed. FIG. 5B shows the case in which the reduction rate is ½. FIG. 5C shows the case in which the reduction rate is ⅓. As shown in FIGS. 5A to 5C, the detection conditions of the images at the contour portion of the stone are about the same, but the detection condition of the image, of which the reduction rate is ⅓, at the pattern portion (noise) of the stone is the smallest. The processing time after the reduction processing is reduced by the reduction processing. The initial value of the reduction rate may be ½. In this case, in consideration of the final result, if necessary, the reduction rate can be changed such that the case is selected from the case in which the reduction processing is not performed, the case in which the reduction rate is ⅓, and the case in which the reduction rate is ¼.

1.2 Lightness Correction Section

The lightness correction section supposes various illumination condition and performs lightness correction. The lightness correction section performs the following two-step processing. First, the lightness correction section performs histogram stretching, and performs gamma correction based on the average value of brightness after the histogram stretching. When the minimum brightness of the input image is 0 and the maximum brightness of the input image is 255, the lightness correction section does not perform histogram stretching. The lightness correction section may not perform gamma correction depending on the average value of brightness.

The histogram stretching is processing in which the histogram is stretched so that contrast is enhanced. First, the minimum value and the maximum value of the brightness of the input image are calculated. Linear transformation of the brightness is performed by using the following Equation 1 so that the minimum value of the brightness is set to at 0 and the maximum value of the brightness is set at 255. FIG. 6A is a drawing substitute of a photograph showing an input image, FIG. 6B is a drawing substitute of a photograph showing an image after histogram stretching, FIG. 6C is a histogram of the input image, and FIG. 6D is a histogram after the histogram stretching.

$$I' = \frac{255}{\text{Max} - \text{Min}}(I - \text{Min}) \qquad \text{Equation 1}$$

Max: maximum value of brightness of input image

Min: minimum value of brightness of input image

I: brightness of input image

I': brightness after transformation

Figure 24:
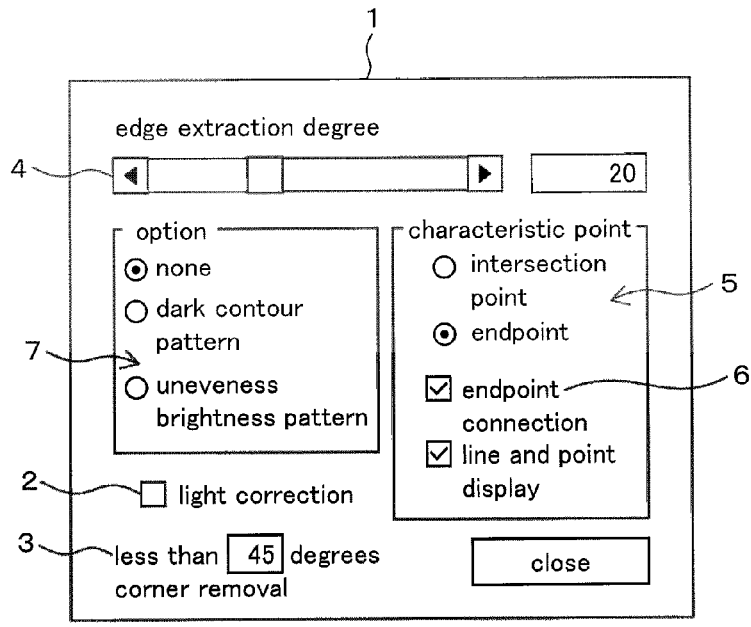
FIG. 24 is a menu screen of an edge extraction program.

It can be selected whether or not the lightness correction section is performed. FIG. 24 shows a menu screen of edge extraction program. It can be selected by using a lightness correction section 2 at the menu 1 whether or not the lightness correction is performed.

Figure 7A:
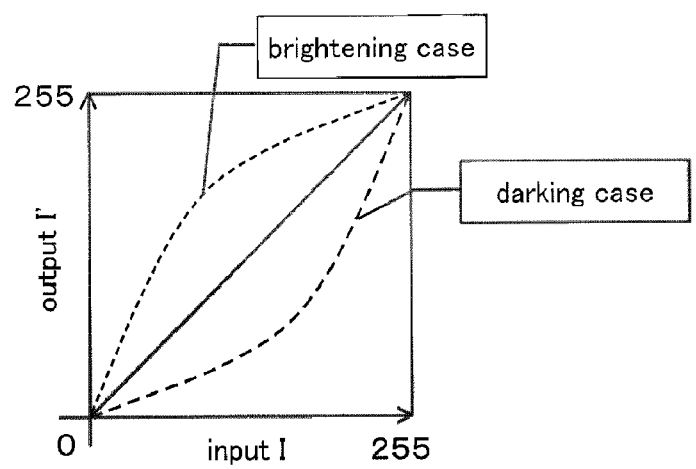
FIG. 7A is a relationship between input brightness and output brightness in gamma correction.
Figure 7B:
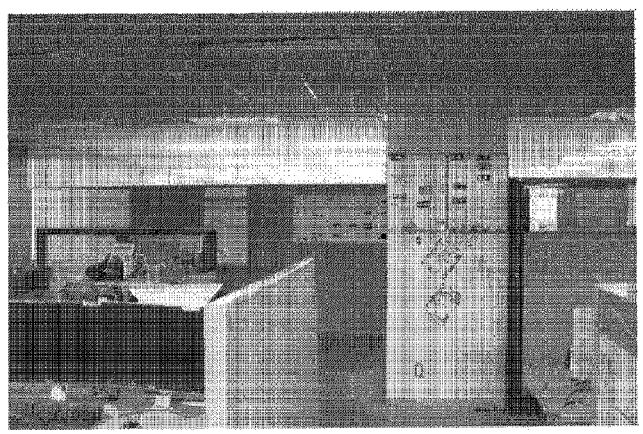
FIG. 7B is a photograph showing an image after the gamma correction.

The gamma correction is also processing for improving the contrast. FIG. 7A is a relationship between input brightness and output brightness in gamma correction, and FIG. 7B is a drawing substitute of a photograph showing an image after the gamma correction. By the gamma correction, an image which is too bright becomes dark (in a case of γ>1), and an image which is too dark becomes bright (in a case of γ<1). First, average brightness i of the image after the histogram stretching is calculated, coefficient (γ value) of the gamma correction is determined based on the average brightness i, and transformation of the brightness is performed. Table 1 shows the relationship between the average brightness i and the γ value. The setting of the γ value can be changeable. After the determination of the γ value, the output brightness I' is calculated from input brightness I by using the following Equation 2.

TABLE 1

| average brightness i | γ value |
| --- | --- |
| i≦60 | 0.4 |
| 60 < i≦100 | 0.5 |
| 100 < i≦230 | no transformation |
| 230 < i | 1.6 |

$$I' = 255 \cdot \left(\frac{I}{255}\right)^\gamma \qquad \text{Equation 2}$$

brightening case: γ<1 darkening case: γ>1

1.3 Gaussian Filter Section

In order to inhibit detection of noise, by using a Gaussian filter, smoothing is performed while edges to be extracted are maintained. The Gaussian filter section performs smoothing by obtaining weighted average such that pixels nearer to a target pixel are more greatly weighed and pixels farther from the target pixel are less weighed. The Gaussian filter section adjusts the degree of smoothing by changing the value of the standard deviation σ which shows broadening. As shown in Equation 4, smoothing image F(x, y) is obtained by convolution of gauss function G(x, y), which is two dimensionally isotropic as shown in Equation 3, to input image f(x, y).

$$G(x, y) = \frac{1}{2\pi\sigma^2} e^{-\frac{(x^2+y^2)}{2\sigma^2}} \qquad \text{Equation 3}$$

$$F(x, y) = G(x, y) * f(x, y) \qquad \text{Equation 4}$$
$$= \int\int_{-\infty}^{\infty} f(\alpha, \beta) \cdot G(x-\alpha, y-\beta) d\alpha d\beta$$

FIG. 9 is a diagram showing an example of a Gaussian filter. The Gaussian filter shown in FIG. 9 is obtained by substituting the value of the standard deviation σ of 0.849321800288 to a gauss function of the Equation 3. In this case, the brightness I' of the target pixel $b_2$ of the 3×3 pixel matrix after the smoothing, which is shown in FIG. 10, is calculated by using the following Equation 5. FIG. 8A is a drawing substitute of a photograph showing an input image, FIG. 8B is a drawing substitute of a photograph showing an image smoothed by a Gaussian filter.

$$I' = \frac{1}{16}(a_1 + 2b_1 + c_1 + 2a_2 + 4b_2 + 2c_2 + a_3 + 2b_3 + c_3) \qquad \text{Equation 5}$$

2. Edge Detection Section

FIG. 11 is a flow chart of an edge detection section. The edge detection section uses a differential filter (in step S2-1), performs thinning (in step S2-2), and performs threshold processing using edge strength (in step S2-3).

2.1. Differential Filter Section

A Sobel filter, a Laplacian filter, a Prewitt filter, a Roberts filter, or the like is used as the differential filter. The differential filter section calculates edge strength by using the differential filter, and makes an edge strength image. FIG. 12A is a differential filter of an X direction and FIG. 12B is a differential filter of a Y direction. Partial differentiation Δxf of the X direction at a target pixel $b_2$ of the 3×3 pixel matrix shown in FIG. 10, partial differentiation Δyf of the Y direction at the target pixel $b_2$, and edge strength I' at the target pixel $b_2$ are calculated by using the following Equation 6.

$$\Delta xf = c_1 + 2c_2 + c_3 - (a_1 + 2a_2 + a_3)$$

$$\Delta yf = a_3 + 2b_3 + c_3 - (a_1 + 2b_1 + c_1)$$

$$I' = \sqrt{(\Delta xf)^2 + (\Delta yf)^2} \qquad \text{Equation 6}$$

The edge strength image is obtained by replacing the brightness value at the target pixel $b_2$ by the edge strength I' obtained by the above Equation 6. FIG. 13A is a drawing substitute of a photograph showing an input image, and FIG. 13B is a drawing substitute of a photograph showing an edge strength image after using a differential filter.

2.2. Thinning Section

The thinning section performs thinning on the edge strength image so that line width is one pixel. Thus, the following processing can be easily performed. The thinning uses a method of Hilditch, Deutsch, Yokoi, Yamura, or the like.

For example, a raster scan is performed on a binarized edge strength image in an upper direction, in a lower direction, in a left direction, and in a right direction in turn, and eight neighboring pixels of a white pixel (1) are thereby checked. When the checked pattern corresponds to at least one of the pattern conditions shown in FIGS. 14A and 14B, the white pixel (1) is replaced by a black pixel (0), and the white pixel (1) is thereby deleted. This processing is repeated until this deletion cannot be performed. Each asterisk shown in FIGS. 14A to 14D may be a white pixel (1) or a black pixel (0).

Figure 15:
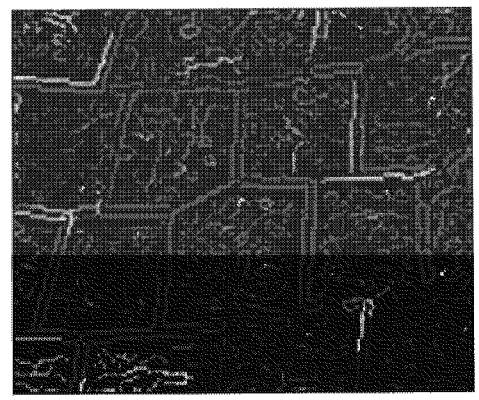
FIG. 15 is a drawing substitute of a photograph showing an edge strength image after thinning.

FIG. 14A shows a pattern condition of a case in which a raster scan is performed from the upper left to the lower right, FIG. 14B shows a pattern condition of a case in which raster scan is performed from the lower right to the upper left, FIG. 14C shows a pattern condition of a case in which a raster scan is performed from the upper right to the lower left, and FIG. 14D shows a pattern condition of a case in which a raster scan is performed from the lower left to the upper right. The processing is performed by the raster scan from the four directions in turn, so that the edges are thinned into one pixel at the center. FIG. 15 is a drawing substitute of a photograph showing an edge strength image after thinning.

2.3. Threshold Processing Section

Figure 16:
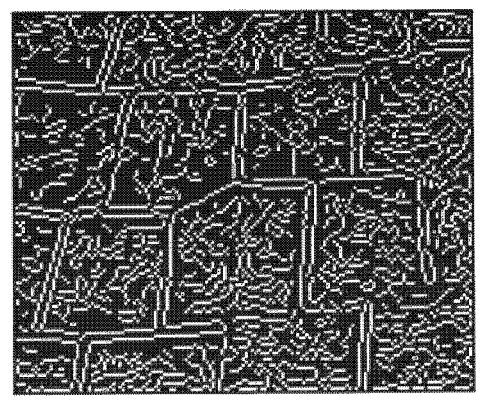
FIG. 16 is a drawing substitute of a photograph showing a binarized edge image.

The threshold processing section performs threshold processing on the thinned edge strength image so as to remove noise. In the threshold processing, the threshold value is low (about 1% of the maximum of the edge strength or less), so that many edges remain, and noise removal is performed in the following edge extraction processing. Thus, for example, the edge strength is binarized by using the threshold value of 20. FIG. 16 is a photograph showing a binarized edge image.

3. Edge Extraction Section

Figure 17:
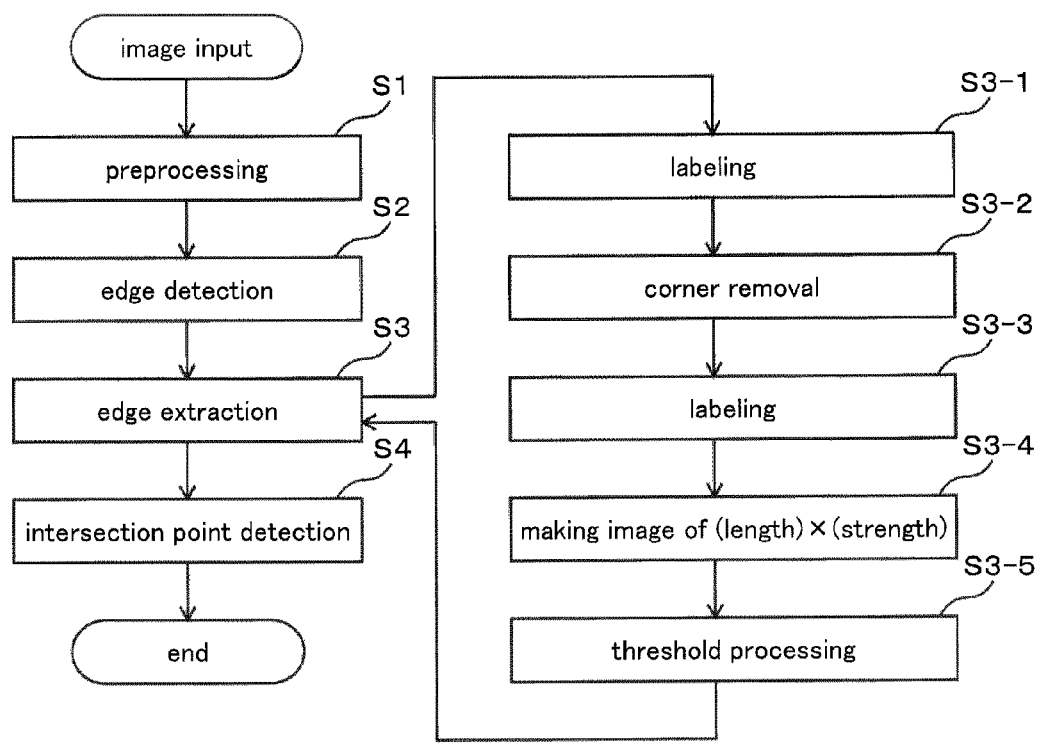
FIG. 17 is a diagram showing a flow chart of an edge extraction section.

FIG. 17 is a flow chart of an edge extraction section. The edge extraction section performs labeling (in step S3-1), and removes corners of the edges subjected to the labeling (in step S3-2). The edge extraction section performs labeling on the edges of which the corners are removed again, and calculates lengths of the edges (in step S3-3). The edge extraction section makes an edge enhanced image obtained by (length of edge)×(edge strength) (in step S3-4). The edge extraction section performs threshold processing by (length of edge)× (edge strength) (in step S3-5). Thus, the edge extraction section extracts edges which form contour of the article.

3.1. First Labeling Processing Section

The first labeling processing section assigns the same label to pixels of the same connected component, and assigns different labels to pixels of the different connected component. For example, labeling processing using an eight neighboring type includes a first step and a second step. In the first step, raster scan is performed and label is assigned tentatively. In the second step, the label is renewed with reference to a lookup table made in the first step. FIG. 18A is a diagram showing eight neighboring pixels, and FIGS. 18B and 18C are diagrams showing an image subjected to labeling and a lookup table.

In the first step, when a label is not assigned to the neighboring pixels $X_2$ to $X_5$ shown in FIG. 18A, a new label is assigned to $X_0$, and the new label i is added to the lookup table shown in FIG. 18B. When the same label is assigned to the neighboring pixels $X_2$ to $X_5$, or the label is assigned to one of the neighboring pixels $X_2$ to $X_5$, the label is assigned to $X_0$. When different labels are assigned to the neighboring pixels $X_2$ to $X_5$, the label which is the minimum is assigned to $X_0$. For example, of the neighboring pixels $X_2$ to $X_5$ which are near to the target pixel $X_0$ surrounded by the circle as shown in FIG. 18B, 2 is assigned to the neighborhood pixel $X_2$, 3 is assigned to the neighboring pixel $X_4$, and 3 is assigned to the neighboring pixel $X_5$. Thus, 2, which is the minimum, is assigned to the neighboring pixel $X_0$. In this case, as shown in FIG. 18C, the lookup table shows that the label 3 is equivalent to the label 2. Thus, the label 2 is substituted to LUT (3).

In the second step, the label in the image is replaced by the equivalent label based on the lookup table. For example, in a case shown in FIG. 18C, the label 3 in the image is replaced by 2 (=LUT (3)). This processing is repeated until there is no label to be replaced. Thus, a different label is assigned to the different connected component.

3.2. Corner Removal Section

The corner removal section detects corners with respect to each label, and removes the detected corners. Thus, contour formed by a line component or a curve component is extracted. For example, a contour shape formed by a line component (triangle or quadrangle) is divided into three lines or four lines by removing corners. When the lines are long, they are detected as an edge by the following the edge extraction section, and when the lines are short, they are removed as noise by the following the edge extraction section. By the following intersection point detection section, intersection points of the three lines or the four lines are detected and are connected, so that a contour shape formed by a line component (triangle or quadrangle) is detected. For example, a contour shape formed by a curved component (ellipsoid) is divided into two curves by removing corners. When the curves are long, they are detected as an edge by the following the edge extraction section, and when the curves are short, they are removed as noise by the following the edge extraction section. By the following intersection point detection section, intersection points of the two curves are detected and are connected, so that a contour shape formed by a curve component (ellipsoid) is detected.

Figure 19:
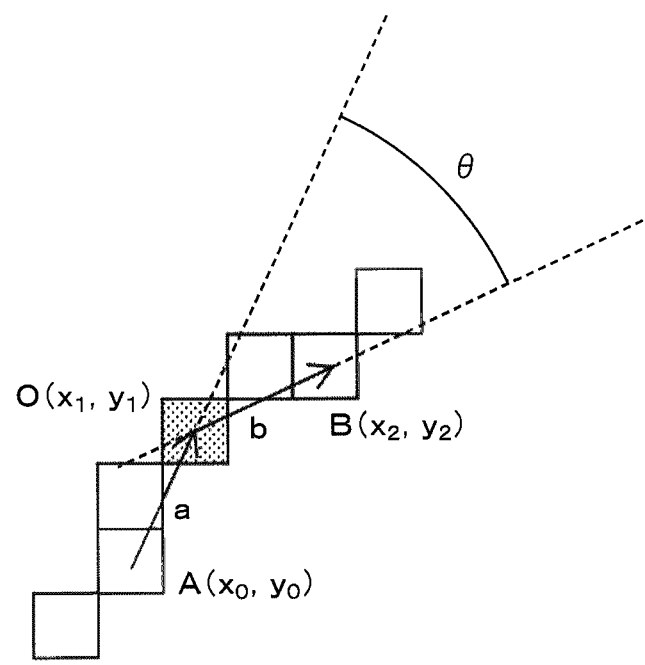
FIG. 19 is a diagram showing a corner detection method.

A corner removal method will be explained hereinafter. FIG. 19 is a diagram showing a corner detection method. Corner detection is performed such that a vector "a" between a target pixel O and a pixel A, which is positioned n pixels behind, is calculated. A vector "b" between a target pixel O and a pixel B, which is positioned n pixels ahead, is calculated. Angle difference between the vectors "a" and "b" is calculated by the following Equation 7.

$$\cos\theta = \frac{\langle a, b \rangle}{\|a\| \cdot \|b\|} \qquad \text{Equation 7}$$
$$= \frac{(x_1 - x_0)(x_2 - x_1) + (y_1 - y_0)(y_2 - y_1)}{\sqrt{(x_1 - x_0)^2 + (y_1 - y_0)^2} \sqrt{(x_2 - x_1)^2 + (y_2 - y_1)^2}}$$

For example, when "n" is 2 and change in direction of vector is 45 degrees or more, the corner removal section judges the target pixel O as a corner, and replaces it by a black pixel, thereby removing the corner. The angle of the corner to be removed (the angle difference between the vectors "a" and "b") can be adjusted by a corner angle adjustment section 3 in a menu screen 1 shown in FIG. 24. Thus, the contour, which is formed by a line component or a curve component, can be extracted.

Figure 20:
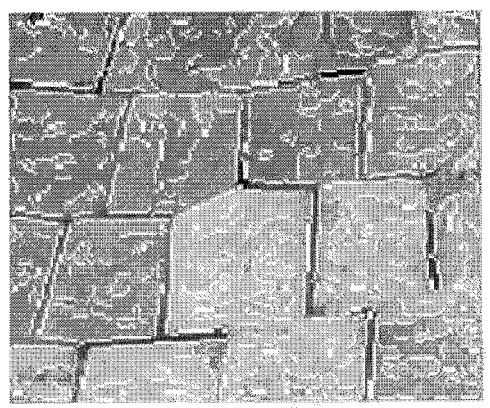
FIG. 20 is a drawing substitute of a photograph showing a stone wall image after corner removal.
Figure 21:
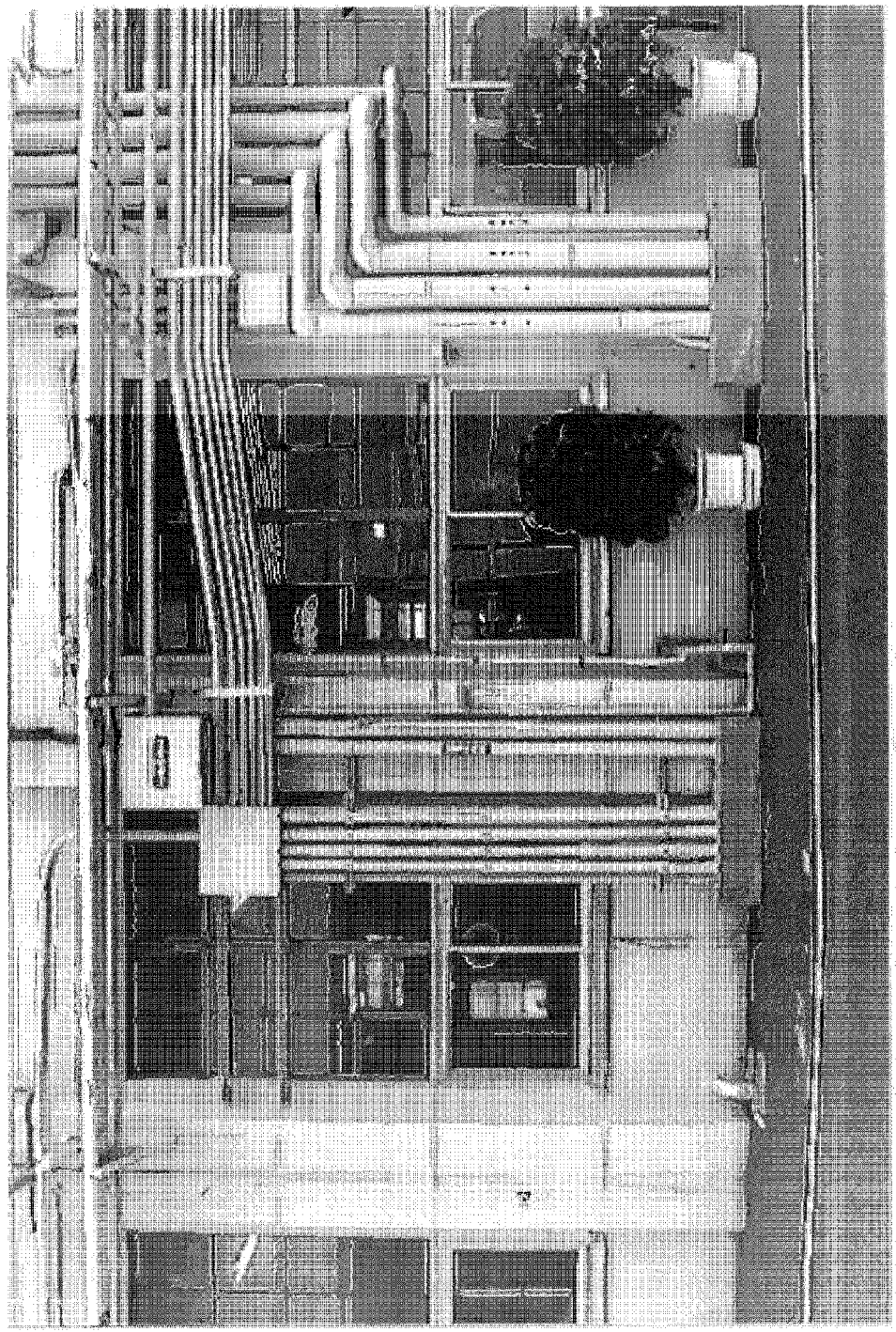
FIG. 21 is a drawing substitute of a photograph showing a sample image of contour edge formed by a line component.
Figure 22:
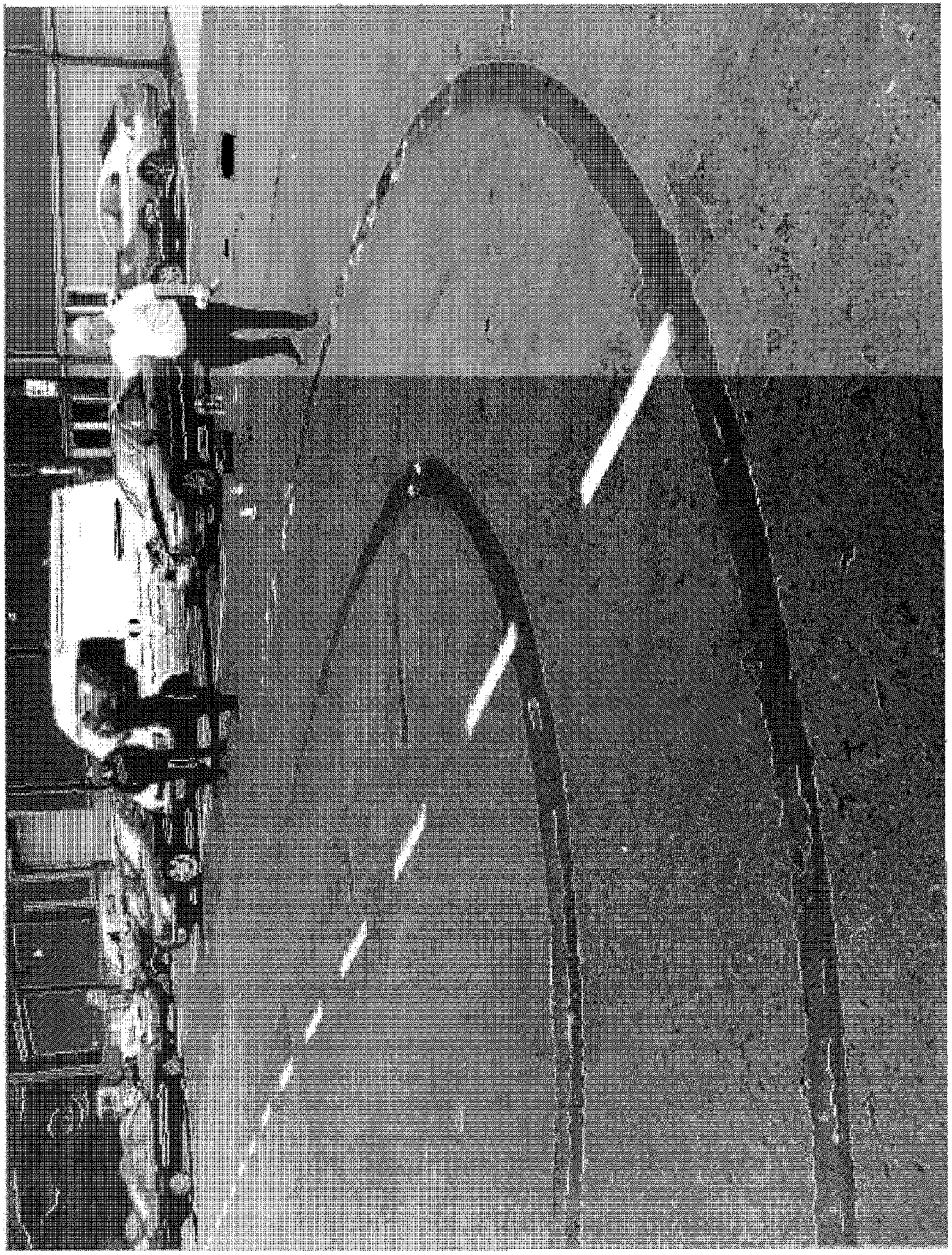
FIG. 22 is a drawing substitute of a photograph showing a sample image of contour edge formed by a curve component.

FIGS. 20 to 22 show processing results by the corner removal section. FIG. 20 is a drawing substitute of a photograph showing a stone wall image after corner removal. FIG. 21 is a drawing substitute of a photograph showing a sample image of contour edge formed by a line component. FIG. 22 is a drawing substitute of a photograph showing a sample image of contour edge formed by a curve component. As shown in FIG. 20, the edges of the pattern portion of the stone wall have more corners than those shown in FIG. 16 showing the case before the corner removal. Due to this, the edges become short by removing the corners, and it is difficult to be extracted as an edge. On the contour of the leaf of the garden tree shown in FIG. 21, the corners are removed by the corner removal section, the edges are divided, the lengths of the edges becomes short, and the contour of the leaf of the garden tree is processed as noise. On the other hand, the pipe shown in FIG. 21 has a contour edge formed by a line component, so that the corners are not removed. The lengths of the edges are long, so that the pipe is extracted as a contour edge.

In the same manner, on the asperity of the surface of the road shown in FIG. 22, the corners are removed by the corner removal section, the edges are divided, the lengths of the edges become short. The threshold processing is performed on the asperity of the surface of the road by the edge extraction section, and the asperity is processed as noise. On the other hand, the trail of tire shown in FIG. 22 is contour edge formed by a curve component, so that the trail is not removed by adjusting the angle of the corner. The lengths of the edges are long, so that the trail is extracted as a contour edge.

The extraction of contour formed by a line component or a curve component may use the Hough transform. The extraction by the above corner removal can be performed faster than the Hough transform since storage capacity and calculation amount are small in the extraction by the corner removal.

3.3. Second Labeling Section

Since the same labels are connected by removing the corners and the same label thereby loses connectivity, the second labeling section performs labeling on the edges again after the corner removal. In this case, the second labeling section calculates the lengths of the edges and it calculates the cumulative value of the edge strength calculated in step S2-1 with respect to each label. The labeling method is the same method as that of the first labeling section.

3.4. Edge Enhancement Section

After the labeling again by the second labeling section, the edge enhancement section performs edge enhancement processing by using an integral value obtained by multiplying (length of edge) by (edge strength) (=(length of edge)×(edge strength)). The brightness of each label is replaced by (length of edge)×(edge strength), and an image of (length of edge)×(edge strength) is produced.

3.5. Edge Extraction Section

The edge extraction section performs threshold processing on the image of (length of edge)×(edge strength), thereby extracting the edges which are contours. The threshold value can be adjusted by a slider operational section 4 in the menu screen 1 shown in FIG. 24. When the edge extraction degree (the threshold of (length of edge)×(edge strength)) is adjusted by the slider operational section 4, the edge extraction image, which is the result thereof, is displayed in real time. The adjustment of the edge extraction degree may be performed not only by the slider operational section 4 but also by a threshold input section to which the threshold value is directly input.

Figure 23A:
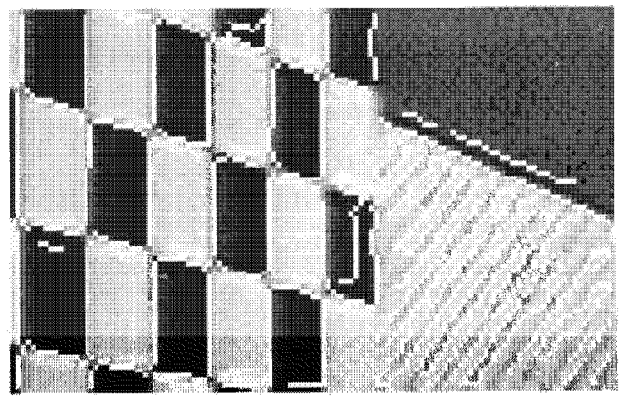
FIG. 23A is a drawing substitute of a photograph showing an edge extracted image of a case in which a threshold value of integration is 250.
Figure 23B:
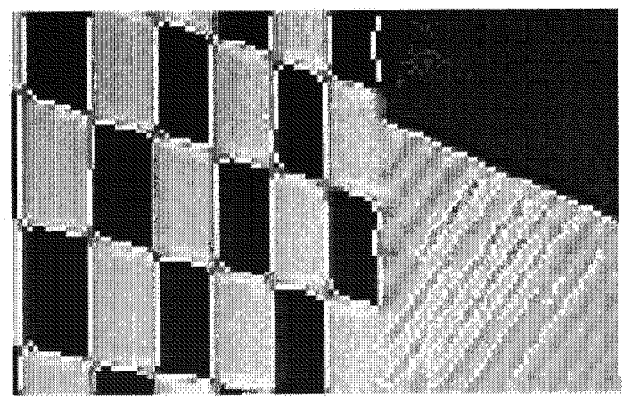
FIG. 23B is a drawing substitute of a photograph showing an edge extracted image of a case in which a threshold value of integration is 1000.
Figure 23C:
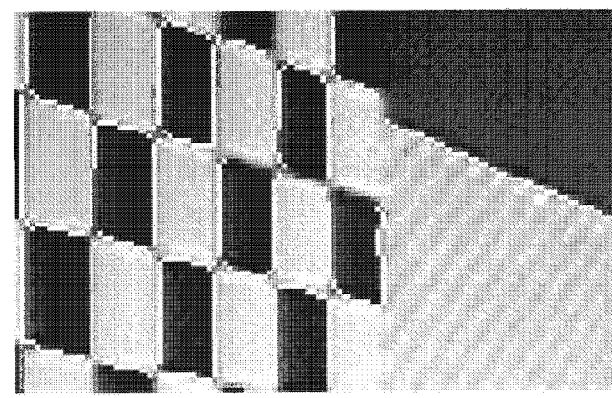
FIG. 23C is a drawing substitute of a photograph showing an edge extracted image of a case in which a threshold value of integration is 4000.

The processed result of the edge extraction section will be explained with reference to FIGS. 23A to 23C. FIG. 23A is a drawing substitute of a photograph showing an edge extracted image of a case in which a threshold value of integration is 250, FIG. 23B is a drawing substitute of a photograph showing an edge extracted image of a case in which a threshold value of integration is 1000, and FIG. 23C is a drawing substitute of a photograph showing an edge extracted image of a case in which threshold value of integration is 4000. At a portion other than the checkered black and white pattern portion, the length of the edge is long but the edge strength is low. By increasing the threshold value of integration as shown in FIGS. 23A to 23C, the portion other than the checkered black and white pattern is not detected as an edge. However, at the checkered black and white pattern portion, the length of the edge is slightly short but the edge strength is relatively high, so that he checkered black and white pattern portion is detected as an edge even when the threshold value of integration is increased.

4. Intersection Point Detection Section

Figure 25:
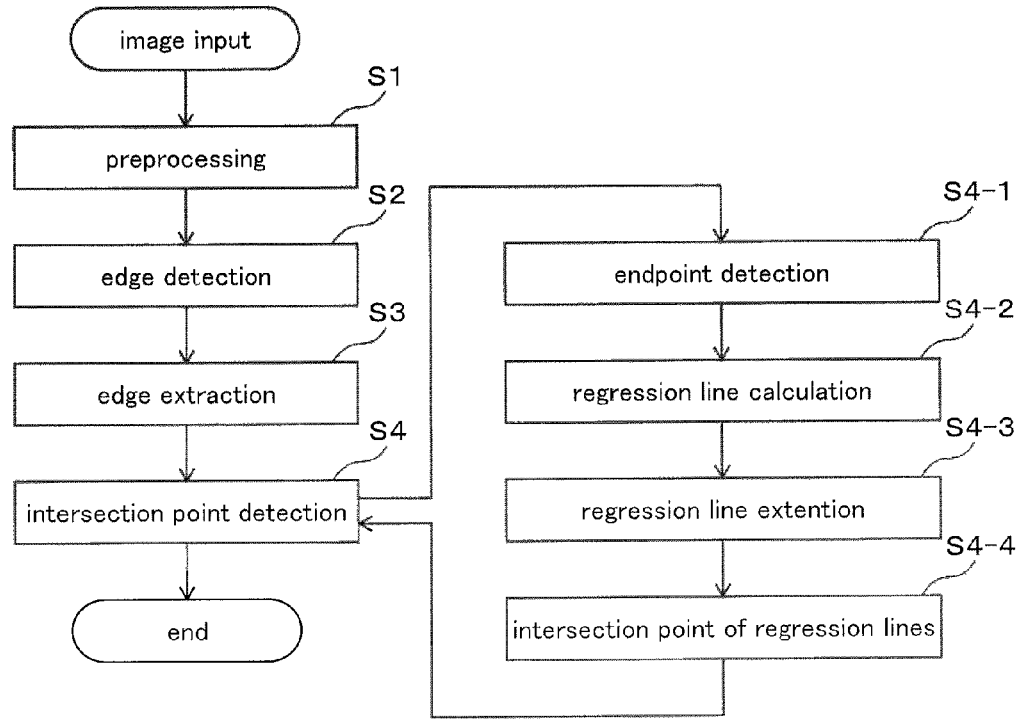
FIG. 25 is a flow chart of an intersection point detection section.

The intersection point detection section detects intersection points of the edges based on the result of the edge extraction. The contour of the article can be estimated by detecting the intersection points thereof. In the intersection point detection, the Hough transform, the regression line, or the like is used. An intersection point detection method using the regression line will be explained hereinafter. FIG. 25 is a flow chart of an intersection point detection section. First, the intersection point detection section detects endpoints (in step S4-1). The intersection point detection section calculates regression lines based on coordinates of the endpoints (in step S4-2), extends the regression lines from the endpoints (in step S4-3), and detects intersection points of the regression lines (in step S4-4).

4.1. Endpoint Detection Section

Figure 26:
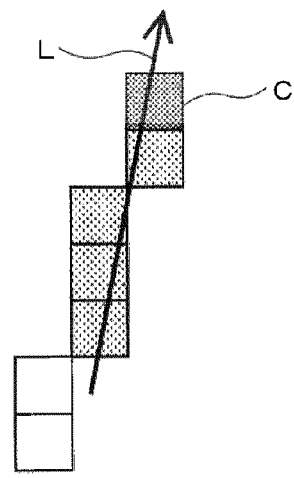
FIG. 26 is a diagram showing an endpoint and a regression line.

The endpoint detection section calculates coordinates of endpoints with respect to the edges extracted by the edge extraction section. FIG. 26 is a diagram showing an endpoint and a regression line. For example, when only the one pixel is a white pixel (1) of eight neighboring pixels of the target pixel, the endpoint detection section judges the target pixel as an endpoint C.

4.2. Regression Line Calculation Section

The regression line calculation section simply calculates a slope and a y-intercept of the regression line L based on coordinates of two endpoint at each edge. Based on all the pixel coordinates $(x_i, y_i)$ at each edge, correlation function "r" may be calculated, and a slope "a" and a y-intercept "b" of the regression line may be calculated by using the following Equation 8.

$$\gamma = \frac{\frac{1}{n}\sum_{i=1}^{n}(x_i-\bar{x})(y_i-\bar{y})}{\sqrt{\frac{1}{n}\sum_{i=1}^{n}(x_i-\bar{x})^2}\sqrt{\frac{1}{n}\sum_{i=1}^{n}(y_i-\bar{y})^2}}$$

$$a = \frac{\frac{1}{n}\sum_{i=1}^{n}(x_i-\bar{x})(y_i-\bar{y})}{\frac{1}{n}\sum_{i=1}^{n}(x_i-\bar{x})^2}$$

$$b = \bar{y} - \bar{x}a$$

Equation 8

γ: correlation function
a: slope of regression line
b: y-intercept of regression line
$(x_i, y_i)$: pixel coordinate
$(\bar{x}, \bar{y})$: average of pixel coordinates
n: number of pixels in each edge

4.3. Extension Section for Regression Line

Figure 27A:
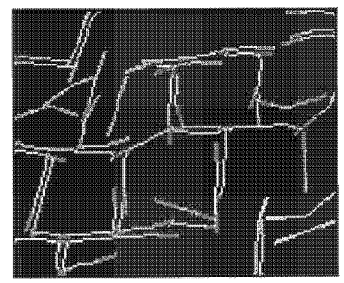
FIG. 27A is a drawing substitute of a photograph showing a result of a case in which a regression line is extended.

The extension section for regression line extends the regression line from the endpoint based on the slope and the y-intercept of the regression line. The regression line is extended by one pixel from each endpoint. A label for the regression line is assigned to the extended pixel. FIG. 27A is a diagram showing a result of a case in which a regression line is extended.

4.4. Intersection Point Detection Section for Regression Line

Figure 27B:
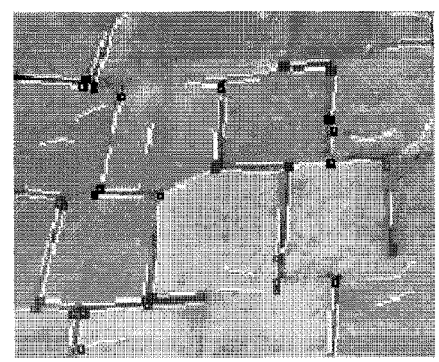
FIG. 27B is a drawing substitute of a photograph showing an intersection point detected result.

The intersection point detection section uses the extended pixels as a target pixel, and it checks whether or not three or more labels for the regression line exists at the eight neighboring pixels. When three or more labels for the regression line exist, the intersection point detection detects the target pixel as an intersection point, and assigns a label for the intersection point. When a label for intersection point already exists at the eight neighboring pixels, the intersection point detection does not detect the target pixel as an intersection point. FIG. 27B is a diagram showing an intersection point detected result. The black pixel shown in FIG. 27B is a detected intersection point.

On the menu screen 1 shown in FIG. 24, an intersection point and endpoint selection section 5 is provided. When "intersection point" is selected, the intersection point detection is performed. When "endpoint" is selected, only the endpoint detection is performed. By using an endpoint connection section 6, it can be selected whether or not endpoints are connected. Switching between a display mode and a non-display mode of the extracted edges, the endpoints, and the intersection points can be performed.

Preferableness of First Embodiment

In the first embodiment, the edge extraction device and the program perform the threshold processing by using (length of edge)×(edge strength). Thus, the portion, which has the length of the edge which is relatively short and the edge strength which is relatively low, is removed as noise. The portion, which has the high edge strength, is not removed even when the length of the edge is short. The portion, which has the long edge strength, is not removed even when the edge strength is low. By this feature, detection amount of noise other than the contour of the article can be reduced.

As shown in FIG. 24, the edge extraction degree can be adjusted by only the one parameter ((length of edge)×(edge strength)), and the edge extraction image, which is the result thereof, is displayed in real time. Thus, it is unnecessary to repeat an operation in which plural parameters are readjusted once or twice and results are checked. Therefore, a desired edge can be extracted intuitively rapidly and the operability can be improved.

2. Second Embodiment

Modification examples of the edge extraction device and the program will be explained hereinafter. In the second embodiment, the processing content of the preprocessing can be changed depending on characteristics of the article.

On the menu screen shown in FIG. 24, a pattern selection section 7 is provided as an optional function. When the option of "none" is selected, processing is the same as the preprocessing in the first embodiment.

The option of "dark contour pattern" is used for a case in which characteristics (for example, contours of stones of a stone wall), which are darker than surroundings, are extracted. The detection accuracy of the contour can be improved by selecting this option. The preprocessing section corrects lightness (in step S1-2), and uses a minimum filter. For example, the minimum filter is used for replacing the brightness value of target pixel by the minimum value of the brightness value of the eight neighboring pixels.

The option of "unevenness brightness pattern" is used for a case in which the brightness unevenness of characteristics of the article (for example, a road) is greater than that of the surroundings. The detection of the noise due to surface roughness of road portion can be inhibited by selecting the option of "unevenness brightness pattern". By the option of "unevenness brightness pattern" (in step S1-3), the preprocessing section uses a Gaussian filter for setting the gradation to be greater. The Gaussian filter section generates a real type filter by substituting the value σ(=1) to the Gaussian function of the Equation 3, and performs the processing.

Preferableness of Second Embodiment

In the second embodiment, since the adjustment of the image quality is performed depending on the characteristics of the article, the detection accuracy of the contour of the article is improved, and the detection of the noise can be inhibited.

3. Third Embodiment

Modification examples of the edge extraction device and the program will be explained hereinafter. In the third embodiment, the threshold value of the edge strength in the edge detection is automatically determined by the signal-to-noise ratio.

In the threshold processing (step S2-3) shown in FIG. 11, the edge detection section detects edges by using the low threshold value (about 1% or less of the maximum value of the edge strength, for example, 20). However, in this fixed threshold value, when the article having a low edge strength is used, the edge may not be detected. When the edge cannot be detected in step S2-3, the threshold processing of (length of edge)×(edge strength) in step S3-5 cannot be performed. When this fixed threshold value is even lower, new noise may be detected.

In order to solve this problem, the threshold value in step S2-3 is automatically determined by the signal-to-noise ratio. For example, when the threshold value of the edge strength is fixed at 20 and the threshold value of (length of edge)×(edge strength) is fixed at 2.0, the number of pixels which are finally used as an edge is "signal", and the number of pixels which are not finally used as an edge is "noise", the signal-to-noise ratio is calculated by the following Equation 9.

$$S/N = \frac{\text{number of pixels of edges}}{\text{number of pixels of noise}} \qquad \text{Equation 9}$$

Table 2 shows calculated signal-to-noise ratios of plural sample images (not shown in the Figure). The signal-to-noise ratios of "room" and "factory" having a relatively low edge strength of the sample images are 2.0 or more, and are more than three times as large as the signal-to-noise ratio (0.77) of the "church" which is the third-largest signal-to-noise ratio.

TABLE 2

| sample | signal | noise | S/N |
| --- | --- | --- | --- |
| room | 34431 | 11737 | 2.93 |
| factory | 38164 | 15606 | 2.45 |
| accident scene | 9978 | 27072 | 0.37 |
| mining | 57308 | 90761 | 0.63 |
| stone wall | 17924 | 42526 | 0.42 |
| church | 33126 | 43073 | 0.77 |

Since the signal-to-noise ratio shows noise level, it can be automatically determined whether or not the threshold value in step S2-3 is decreased by the signal-to-noise ratio. For example, according to the results shown in Table 2, when the signal-to-noise ratio is 2.0 or more, the noise is small, so that the threshold value in step S2-3 is set at 15, and the edge detection section detects many edges. When the signal-to-noise ratio is less than 2.0, the noise is large, so that the threshold value of the edge strength is set at 20, and the detection of the noise can be inhibited.

Preferableness of Third Embodiment

In the third embodiment, even when an article having a low edge strength is used, the edges can be detected while the generation of the noise is inhibited.

4. Fourth Embodiment

A survey instrument (total station) using the edge extraction device and the program will be explained hereinafter. The survey instrument of the fourth embodiment is a total station which measures such that a line of sight of the survey instrument is adjusted so as to be directed to the edges, which are extracted, the endpoints, and the intersection points.

Construction of Survey Instrument

Figure 28A:
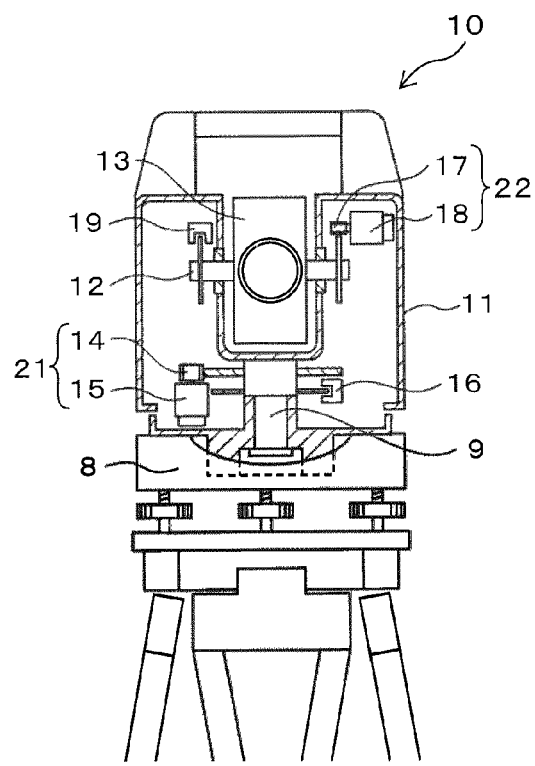
FIG. 28A is a cross sectional view of a survey instrument.
Figure 28B:
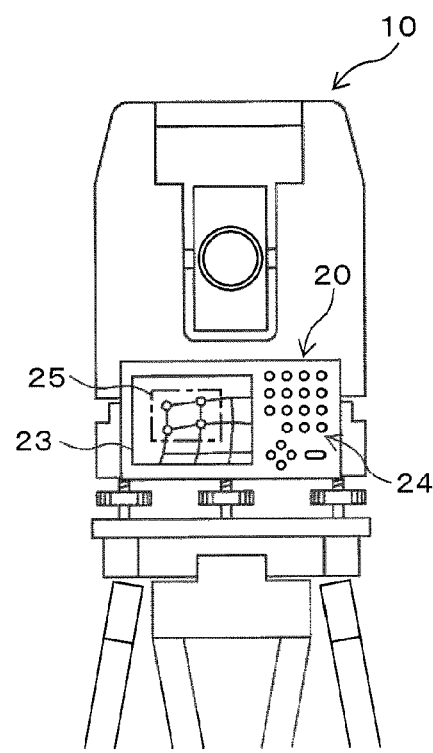
FIG. 28B is an appearance diagram of a survey instrument.
Figure 29:
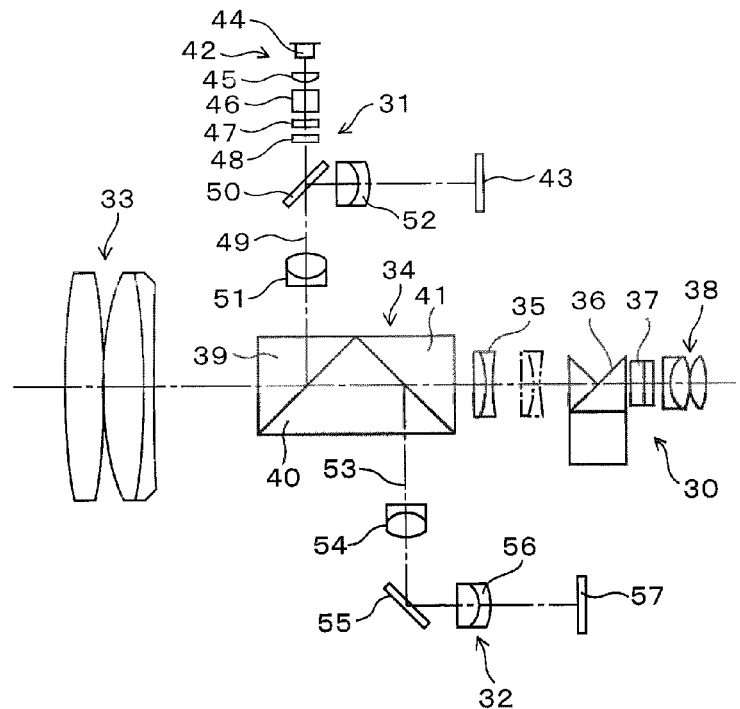
FIG. 29 is a diagram showing an optical system in a lens barrel portion.

The construction of the survey instrument will be explained hereinafter with reference to FIGS. 28 to 30. FIG. 28A is a cross sectional view of a survey instrument, and FIG. 28B is an appearance diagram thereof. The survey instrument 10 is equipped with a base plate portion 8, a survey instrument main body 11, a lens barrel portion 13, and a display device 20. The base plate portion 8 is provided on a tripod. The survey instrument main body 11 is rotatably supported around a vertical shaft 9 on the base plate portion 8. The lens barrel portion 13 is rotatably supported around a horizontal shaft 12 which is provided at the survey instrument main body 11.

A horizontal driving section 21, which horizontally rotates the lens barrel portion 13 around the vertical shaft 9, is provided at the survey instrument main body 11. The horizontal driving section 21 horizontally rotates the lens barrel 13 by using a horizontal rotational motor 15 via a horizontal rotational driving gear 14. A horizontal angle measuring section 16, which detects a horizontal angle by using a horizontal angle encoder, is provided at the vertical shaft 9.

A vertical driving section 22, which horizontally rotates the lens barrel portion 13 around the horizontal shaft 12, is provided at the lens barrel portion 13. The vertical driving section 22 horizontally rotates the lens barrel portion 13 by using a vertical rotational motor 18 via a vertical rotational driving gear 17. A vertical angle measuring section 19, which detects a vertical angle by using a vertical angle encoder, is provided at the horizontal shaft 12.

The survey instrument 10 drives the horizontal driving section 21 and the vertical driving section 22 so that the collimation position is positioned at the measurement point. When the measurement point is positioned at the center of the collimation position, the survey instrument 10 detects a horizontal angle and a vertical angle by using the horizontal angle measuring section 16 and the vertical angle measuring section 19.

An optical system, which has a telescope section 30, a distance measuring section 31, and a photographing section 32, is provided in the lens barrel portion 13. FIG. 29 is a diagram showing an optical system in a lens barrel portion. An objective lens 33, a dichroic prism 34, a focusing lens 35, a normal prism 36, a reticle 37, and an eyepiece lens 38 are provided in turn on an optical axis of the telescope section 30. The dichroic prism 34 has prisms 39 to 41, and forms a first surface and a second surface which are dichroic mirror surfaces.

The first surface allows visible light of incident light, which enters from the objective lens 33, to pass therethrough, and the first surface reflects infrared light. The second surface divides the visible light which passed through the first surface. For example, the first surface allows visible light having a wavelength of 400 to 650 nm to pass therethrough, and reflects infrared light having a wavelength of 650 to 850 nm. For example, the second surface allows 40% of visible light having a wavelength of 400 to 650 nm to pass therethrough, and reflects 60% thereof. The visible light, which entered from the objective lens 33 and passed through the first surface and the second surface, forms an image on the reticle 37 by the focusing lens 35, and it is observed. The distance measuring section 31 is provided on a reflection light axis 49 of the reflection light reflected by the first surface. The photographing section 32 is provided on a reflection light axis 53 of the reflection light reflected by the second surface.

The distance measuring section 31 has a light emitting section 42 and a light receiving section 43. The light emitting section 42 is a solid-state laser which performs pulse oscillation of a laser beam, and performs non-prism distance measurement using no corner cube at the measurement point. The light emitting section 42 has a laser beam source 44, a collecting lens 45, a laser medium 46, a supersaturated absorber 47, and a resonant mirror 48. The pulsed laser beam oscillating from the light emitting section 42 passes through a mirror 50, which has an opening, and a relay lens 51. In this case, the mirror 50 and the relay lens 51 are positioned on the distance measurement axis 49. The laser beam is reflected by the first surface and exits from the objective lens 33. The laser beam reflected by the measurement point is reflected by the first surface and the mirror 50, passes through a relay lens 52, and is received by the light receiving section 43.

After the collimation position is adjusted to be positioned at the measurement point by the survey instrument 1, the pulsed laser beam is oscillated from the light emitting section 42 by the distance measuring section 31. The distance measuring section 31 performs the distance measuring by calculating the distance from the measurement point based on time lag and the speed of the light. In this case, the time lag is between the time at which the light emitting section 42 emits laser beam and the time at which the light receiving section 43 receives the laser beam.

The photographing section 32 photographs visible light divided by the second surface. The visible light divided by the second surface forms an image on a photographing element 57 via a relay lens 54, a reflection mirror 55, and a relay lens 56. For example, the photographing element 57 is a CMOS sensor having pixels of 640×480. The image photographed by the photographing element 57 is displayed on the display device 20 shown in FIG. 28B.

The display device 20 is equipped with a display section 23 and an operational section 24. The display section 23 displays an image photographed by the photographing section 32, the menu screen, or the like. The display section 23 is a touch-controllable liquid crystal. A measurement area 25 can be set on an image displayed on the display section 23. For example, square specification using two diagonal points is performed on the image, a line of sight of the telescope section 30 is adjusted so as to be directed to the two specified diagonal points, a horizontal angle and a vertical angle are calculated, so that the measurement area 25 is set. Thus, the horizontal angle and the vertical angle, which correspond to image coordinates, are related. The operational section 24 performs input operation of measurement conditions, scan start command of scan area, and the like.

Figure 30:
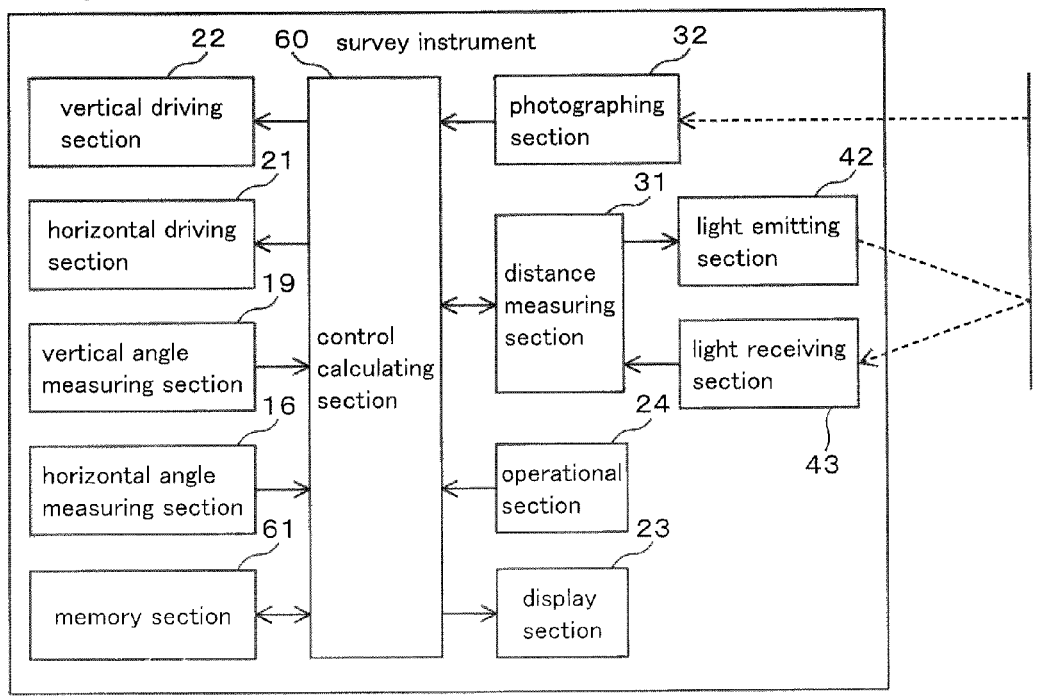
FIG. 30 is a block diagram of a survey instrument.

FIG. 30 is a block diagram of a survey instrument. The survey instrument 10 is integrally controlled by a control calculating section 60, and the control calculating section 60 sequentially reads and executes a program which is stored in a memory section 61. First, the control calculating section 60 displays an image, which is photographed by the photographing section 32, on the display section 23. A surveyor sets a measurement area 25 on the image displayed on the display section 23. The control calculating section 60 performs edge extraction for the image on the measurement area 25.

In this case, the control calculating section 60 displays the menu screen 1 shown in FIG. 24 on the display section 23. The surveyor adjusts the edge extraction degree ((length of edge)×(edge strength)) by using the slider operational section 4 of the menu screen 1. Extracted edges, endpoints, and intersection points are displayed on the display section 23 shown in FIG. 28B.

When the scan start command is input from the operational section 24, the control calculating section 60 automatically adjusts a line of sight to be directed to only the extracted edges, the endpoints, or the intersection points in the measurement area 25, and the control calculating section 60 performs measurement. In this case, the control calculating section 60 controls the horizontal driving section 21 and the vertical driving section 22 based on pixel coordinate of the extracted edges, the endpoints, or the intersection points, so that the pixel coordinates are set at the center of the collimation position. The control calculating section 60 measures such that the distance measuring section 31 performs the distance measurement and the horizontal angle measuring section 16 and the vertical angle measuring section 19 perform angle measurement. The distance measurement data and the angle measurement data (measurement data) are related with the image coordinate of the measurement points and are stored in the memory section 61.

When the measurement of one measurement point is completed, the control calculating section 60 controls the horizontal driving section 21 and the vertical driving section 22, so that the next pixel coordinates are set at the center of the collimation position, and the control calculating section 60 measures. The above processing is repeated until there are no measurement points remaining.

Action of Survey Instrument

Figure 31:
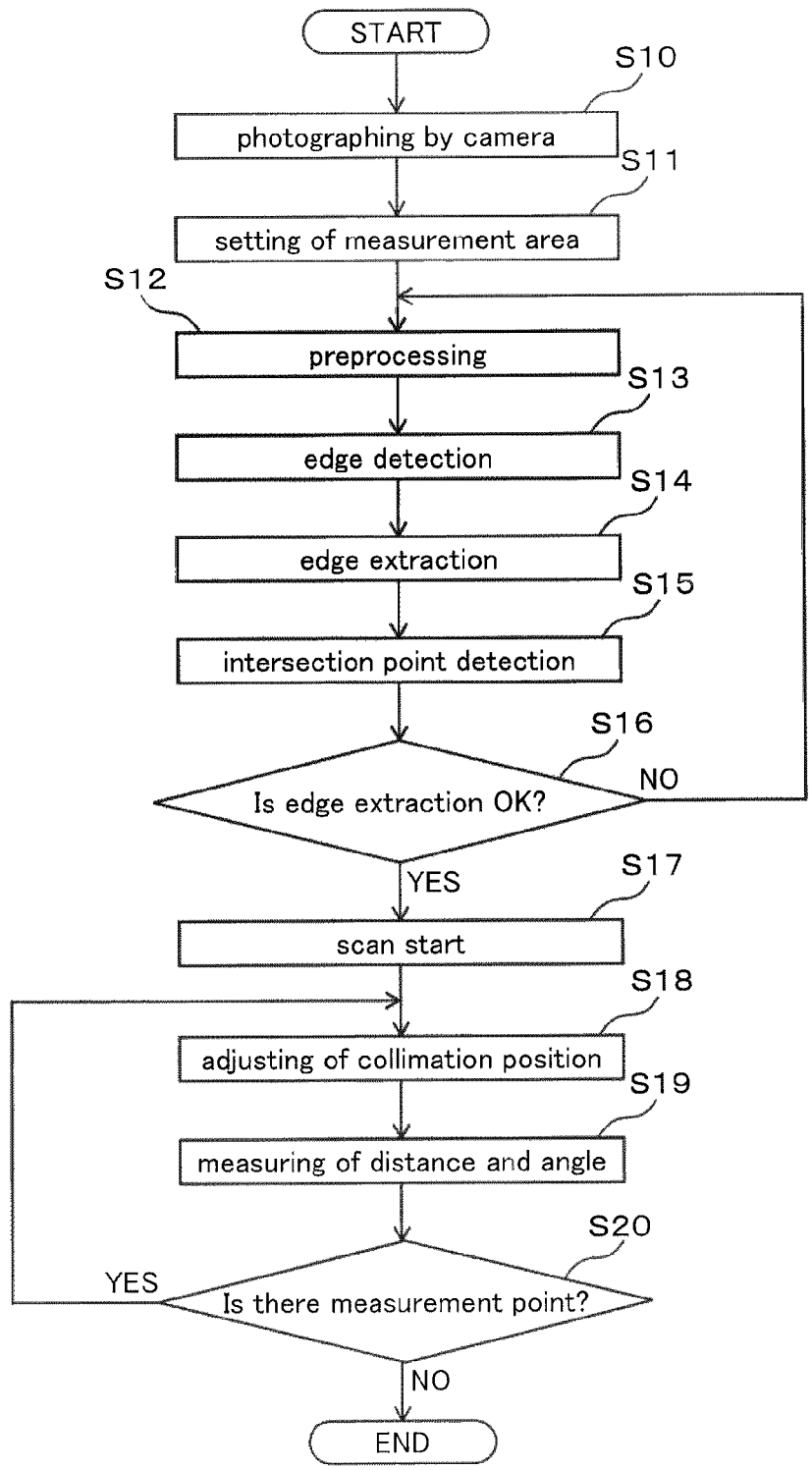
FIG. 31 is a flow chart of a control program of a survey instrument.

The action of the above survey instrument 10 will be explained in detail hereinafter. FIG. 31 is a flow chart of a control program of a survey instrument. First, the photographing section 32 photographs an article to be measured (in step S10). The measurement area 25 is set on the display section 23 on which the photographed image is displayed (in step S11), and the survey instrument 10 performs edge extraction.

First, the surveyor performs various settings by using the menu screen 1 displayed on the display section 23. When the characteristics to be extracted are darker than surroundings, the option of "dark contour pattern" of the pattern selection section 7 is selected. When the brightness unevenness of characteristics of the article is greater than that of the surroundings, the option of "unevenness brightness pattern" is selected. When this case is not the case in which the option of "dark contour pattern" and the option of "unevenness brightness pattern" are used, the option of "none" is selected. When the displayed image is dark or bright, the "lightness correction" in the lightness correction selection section 2 is selected. When the settings are completed, the survey instrument 10 performs preprocessing on the image of the measurement area 25 (in step S12).

Then, the survey instrument 10 performs edge detection of the image subjected to the preprocessing (in step S13), and extracts edges which are contours of the article from the detected edges (in step S14). In this case, the surveyor adjusts the edge extraction degree by using the slider operational section 4 of the menu screen 1. When the option of "intersection point" is selected, intersection points of the edges are detected from endpoints of the extracted edges (in step S15).

When desired edges are not detected (NO in step S16), the settings are readjusted by using the menu screen 1, and the edge extraction is performed again. When desired edges are detected (YES in step S16), the surveyor inputs scan start command by operating the operational section 24 (step S17). In this case, the surveyor operates the operational section 24, thereby selecting the collimation target from the extracted edges, the endpoints, the intersection points, and all of them.

When the scan starts, the survey instrument 10 rotates horizontally and vertically, the collimation position is positioned at the measurement point (the edge, the endpoint, or the intersection point) (in step S18). When the measurement point is set at the center of the collimation position, the distance measuring section 31 performs the distance measurement and the horizontal angle measuring section 16 and the vertical angle measuring section 19 perform angle measurement (in step S19).

When measurement points remain unmeasured, the processing of steps S18 and S19 is repeated (YES in step S20). When there are no measurement points to be measured, the survey instrument 10 completes the measurement (NO in step S20).

Preferableness of Fourth Embodiment

In the fourth embodiment, the survey instrument 10 measures only the extracted edges, endpoints, or the intersection points, the loop processing of steps S18 to S20 is reduced in comparison to the case in which the measurement is performed by scanning entirety of the measurement area, and the measurement can be performed rapidly.

Since the edge extraction degree can be adjusted by only the one parameter ((length of edge)×(edge strength)), the repeated action of steps S12 to S16 is reduced, and the operability of the survey instrument 10 can be improved.

INDUSTRIAL APPLICABILITY

The present invention can be used in an edge extraction device, which performs edge extraction from images, a survey instrument using the edge extraction device, and a program therefor.

What is claimed is:

1. An edge extraction device comprising:
    an edge detection section which calculates edge strength from an image and detects an edge;
    a labeling processing section which performs labeling processing on the edge detected by the edge detection section and calculates a length of the edge;
    an edge enhancement processing section which performs edge enhancement processing by using a value corresponding to the length of the edge, which is calculated by the labeling processing section, and the edge strength, which is calculated by the edge detection; and
    an edge extraction section which performs binarization processing on a value of the image, which is enhanced by the edge enhancement processing section, by using an adjustable threshold value, and extracts a predetermined edge.

2. An edge extraction device according to claim 1, wherein the edge detection section performs edge detection by using a differential filter typified by a Sobel filter.

3. An edge extraction device according to claim 1, wherein the threshold value of the edge extraction section is adjustable by a single operational section.

4. An edge extraction device according to claim 3, wherein the operational section is structured so as to be adjustable by a single slider operational section.

5. An edge extraction device according to claim 1, wherein the edge extraction device further comprises a preprocessing section which performs preprocessing prior to processing by the edge detection section, and the preprocessing section has a processing content structured so as to be changeable in accordance with characteristics of an article.

6. An edge extraction device according to claim 1, wherein the edge extraction device further comprises a preprocessing section which performs reduction processing prior to processing by the edge detection section.

7. An edge extraction device according to claim 1, wherein a signal to noise ratio is defined as a ratio of number of pixels extracted by the edge extraction section to number of pixels not extracted by the edge extraction section, and the edge detection section performs edge detection by automatically determining a threshold value of the edge strength based on the signal to noise ratio.

8. An edge extraction device according to claim 1, wherein the edge extraction device further comprises an intersection point detection section which detects an intersection point of edges extracted by the edge extraction section.

9. An edge extraction device according to claim 8, wherein the intersection point detection section calculates regression lines from endpoints of the edges extracted by the edge extraction section, and detects an intersection point of the regression lines.

10. An edge extraction device according to claim 1, wherein the edge extraction device further comprises a corner removal section which removes a corner of the edge detected by the edge detection section.

11. An edge extraction device according to claim 10, wherein the corner removed by the corner removal section has an angle structured so as to be adjustable.

12. A survey instrument comprising: a structure of the edge extraction device according to claim 8, wherein the survey instrument is structured to perform measurement such that a line of sight is adjusted so as to be directed to the edge extracted by the edge extraction section, or the intersection point or an endpoint detected by the intersection point detection section.

13. A program stored on a non-transitory computer-readable storage medium, the program comprising:
   edge detection for calculating edge strength from an image and detecting an edge;
   labeling processing for performing labeling processing on the edge detected in the edge detection and calculating length of the edge;
   edge enhancement processing for performing edge enhancement processing by using a value corresponding to the length of the edge, which is calculated in the labeling processing, and the edge strength, which is calculated in the edge detection; and
   edge extraction for performing binarization processing on a value of the image, which is enhanced by the edge enhancement processing, by using an adjustable threshold value, and extracting a predetermined edge.

14. A program stored on a non-transitory computer-readable storage medium, the program executed by a survey instrument having a structure of the edge extraction device according to claim 8, wherein the program makes the survey instrument execute a measurement step in which a line of sight of the survey instrument is adjusted so as to be directed to the edge extracted by the edge extraction section, or the intersection point or an endpoint detected by the intersection point detection section.

* * * * *